United States Patent
Wang et al.

(10) Patent No.: US 11,152,964 B2
(45) Date of Patent: Oct. 19, 2021

(54) SIGNAL TRANSMITTER DEVICE AND CALIBRATION METHOD

(71) Applicant: Realtek Semiconductor Corporation, Hsinchu (TW)

(72) Inventors: Wen-Shan Wang, Hsinchu (TW); Yuan-Shuo Chang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/858,860

(22) Filed: Apr. 27, 2020

(65) Prior Publication Data
US 2020/0358465 A1    Nov. 12, 2020

(30) Foreign Application Priority Data

May 9, 2019   (TW) ................................ 108116093

(51) Int. Cl.
*H04B 1/04*  (2006.01)
*H04B 1/16*  (2006.01)
*H04L 27/36*  (2006.01)

(52) U.S. Cl.
CPC ......... *H04B 1/0475* (2013.01); *H04B 1/1638* (2013.01); *H04L 27/364* (2013.01)

(58) Field of Classification Search
CPC .... H04B 1/0475; H04B 1/1638; H03D 7/165; H04L 27/364
See application file for complete search history.

(56) References Cited

U.S. PATENT DOCUMENTS 8,160,191 B2    4/2012  Row et al.
9,184,773 B2   11/2015  Nadiri et al.
(Continued)

FOREIGN PATENT DOCUMENTS

CN    101420242 A    4/2009
CN    101868053 A   10/2010
(Continued)

OTHER PUBLICATIONS

Mirzaei et al., Pulling Mitigation in Wireless Transmitters, IEEE Journal of Solid-State Circuits, 2014, vol. 49, No. 9, 1958.
(Continued)

*Primary Examiner* — David B Lugo
(74) *Attorney, Agent, or Firm* — Locke Lord LLP; Tim Tingkang Xia, Esq.

(57) ABSTRACT

A transmitter device includes a transmitter including a first oscillator circuitry, a signal processing circuitry, and a calibration circuitry, and a second oscillator circuitry. The first oscillator circuitry is configured to output a first oscillating signal. The signal processing circuitry is configured to mix calibration signals according to the first oscillating signal, in order to emit a first output signal. The calibration circuitry is configured to detect a power of the first output signal to generate coefficients, and generate the calibration signals according to the coefficients, an in-phase data signal, and a quadrature data signal. The second oscillator circuitry is disposed adjacent to the transmitter, and is configured to output a second oscillating signal. The calibration signals are configured to reduce a pulling generated by both of the first output signal and the second oscillating signal to the first oscillator circuitry.

19 Claims, 6 Drawing Sheets

(56) References Cited

U.S. PATENT DOCUMENTS

| | | |
|---|---|---|
| 9,306,690 B2 | 4/2016 | Mehr et al. |
| 9,407,425 B1 | 8/2016 | Huang et al. |
| 10,374,643 B2 | 8/2019 | Wang et al. |
| 2009/0088094 A1 | 4/2009 | Hsu et al. |
| 2010/0026395 A1 | 2/2010 | Lane |
| 2013/0343173 A1* | 12/2013 | Ahmadi Mehr ..... H04B 1/0483 370/215 |
| 2014/0191815 A1* | 7/2014 | Mirzaei ................ H03L 7/06 331/1 A |
| 2015/0350000 A1* | 12/2015 | Chang ................ H04L 27/364 375/227 |
| 2017/0194990 A1* | 7/2017 | Wang ................ H04L 27/364 |
| 2018/0254786 A1* | 9/2018 | McLaurin ............ H04B 1/0475 |

FOREIGN PATENT DOCUMENTS

| | | |
|---|---|---|
| CN | 103716059 A | 4/2014 |
| CN | 203775241 U | 8/2014 |
| CN | 103856425 B | 3/2017 |
| CN | 106936452 A | 7/2017 |
| TW | 201914273 A | 4/2019 |

OTHER PUBLICATIONS

China Patent Office, the office action of the corresponding Chinese application No. 201910408882.8 dated Jul. 23, 2021.

* cited by examiner

SIGNAL TRANSMITTER DEVICE AND CALIBRATION METHOD

CROSS-REFERENCE TO RELATED APPLICATION

This application claims priority to Taiwan Patent Application Serial No. 108116093 filed May 9, 2019, which is incorporated herein by reference in its entirety.

BACKGROUND

Field of Invention

The present application relates to a signal transmitter device, and particularly relates to a signal transmitter device having multiple transmitters and a calibration method for eliminating the pulling effect.

Description of Related Art

When the electronic device is equipped with multiple transmitters, multiple RF signals generated by the multiple transmitters may be coupled back to the oscillators in the respective transmitters, so that the oscillating signals generated by the oscillators have phase errors. The above phenomenon is generally referred to as a pulling effect.

In some techniques, the pulling effect of the oscillator itself is calibrated only for a single transmitter, and the calibration mechanism is typically placed after the mixer. As such, the bandwidth required for the calibration mechanism is greater, resulting in the increase of cost and design complexity of the transmitter. In other techniques, a calibration circuit that eliminates the pulling effect is disposed in the phase locked loop. As such, unnecessary phase noise may be introduced, reducing the overall performance of the transmitter.

SUMMARY

An aspect of the present disclosure is a signal transmitter device which comprises a first transmitter and a second oscillator circuitry. The first transmitter includes a first oscillator circuitry, signal processing circuitry, and calibration circuitry. The first oscillator circuitry outputs a first oscillating signal. The signal processing circuitry mixes a plurality of calibration signals according to the first oscillating signal to transmit a first output signal. The calibration circuitry detects a power of the first output signal to generate a plurality of coefficients, and generates the calibration signals according to the plurality of coefficients, an in-phase data signal and a quadrature data signal. The second oscillator circuitry is disposed adjacent to the first transmitter and is configured to output a second oscillating signal. The calibration signals are configured to reduce a pulling generated by both of the first output signal and the second oscillating signal to the first oscillator circuitry.

An aspect of the present disclosure provides a calibration method, comprising: mixing, by a first transmitter, a plurality of calibration signals according to a first oscillating signal to transmit a first output signal, wherein the first oscillating signal is provided by the first oscillator circuitry of the first transmitter; detecting a power of the first output signal to generate a plurality of coefficients; and generating the calibration signals according to the coefficients, the in-phase data signal and an quadrature data signal, wherein the calibration signals are configured to reduce the pulling generated by both of the first output signal and a second oscillating signal to the first oscillator circuitry, and the second oscillating signal is provided by second oscillator circuitry disposed adjacent to the first transmitter.

In summary, the signal transmitter device and the calibration method provided by the embodiments of the present disclosure can generate a plurality of calibration signals, to simultaneously eliminate errors caused by the pulling effect of the transmitter itself and external circuits adjacent to the transmitter. As a result, the performance of multiple transmitters in a signal transmitter device for multiple channel transmission applications can be improved.

It is to be understood that both the foregoing general description and the following detailed description are by examples, and are intended to provide further explanation of the invention as claimed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
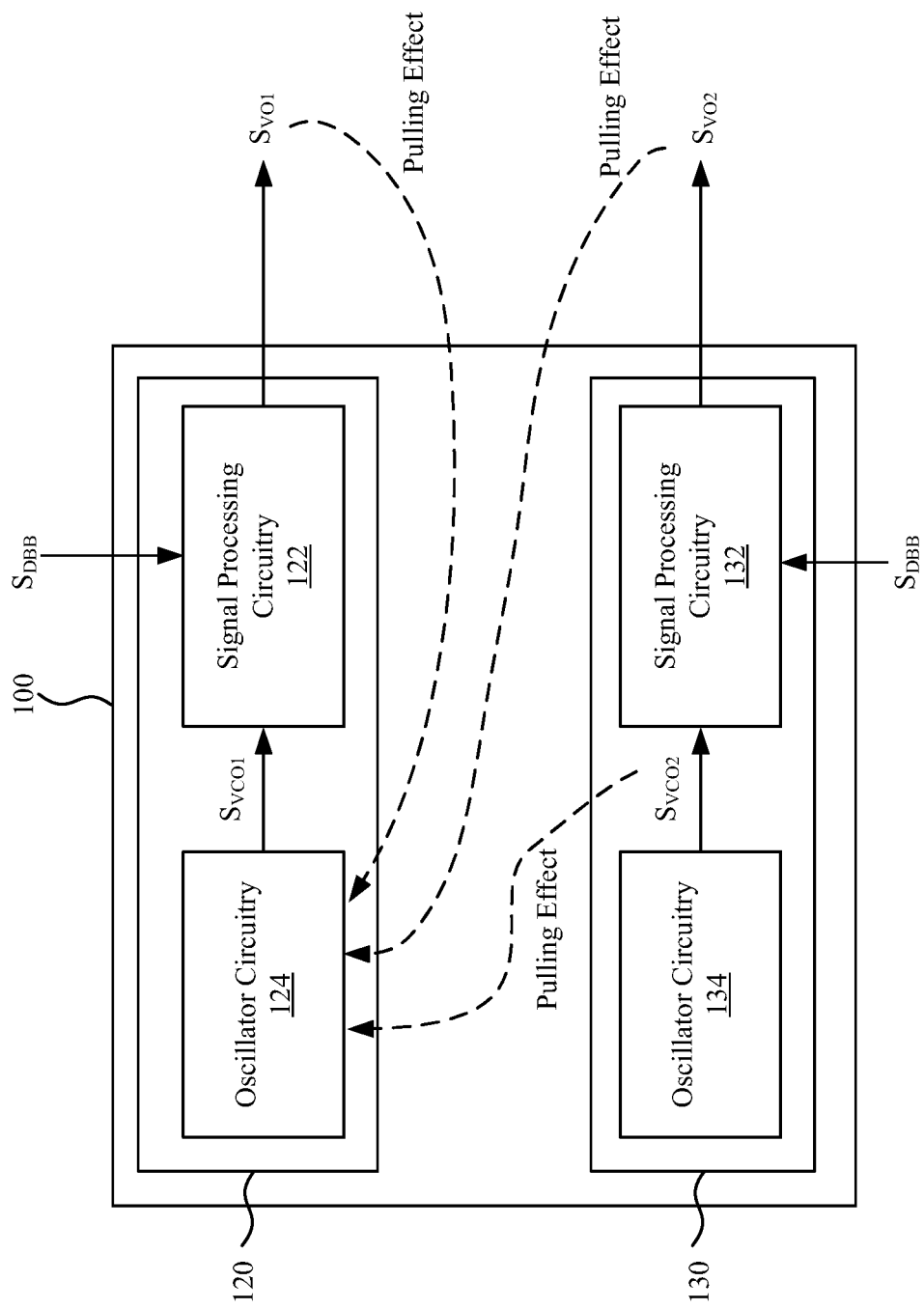
FIG. 1 is a schematic diagram of a signal transmitter device according to some embodiments of the present disclosure.

The embodiments are described in detail below with reference to the appended drawings to better understand the aspects of the present disclosure. However, the provided embodiments are not intended to limit the scope of the disclosure, and the description of the structural operation is not intended to limit the order in which they are performed. Any device that has been recombined by components and produces an equivalent function is within the scope covered by the disclosure. In addition, the drawings are for the purpose of illustration only and are not drawn according to the original dimensions. For ease of understanding, the same or similar elements in the following description will be denoted by the same reference numerals.

The terms "coupled" or "connected" as used herein may mean that two or more elements are directly in physical or electrical contact, or are indirectly in physical or electrical contact with each other. It can also mean that two or more elements interact with each other.

As used herein, the term "circuitry" can generally refer to a single system that includes one or more circuits. The term "circuit" can generally refer to an object that is connected in a certain manner by one or more transistors and/or one or more active and passive components to process a signal.

As used herein, "signal A(t)" refers to a continuous signal of analog form, "signal A[n]" refers to a discrete signal of digital form, which corresponds to the signal A(t). For example, the signal A[n] can be converted to the corresponding signal A(t) through a digital-analog converter. Similarly, in other embodiments, the signal A(t) can be converted to the corresponding signal A[n] by an analog-digital converter.

For ease of understanding, similar elements in the various figures will be designated with same reference numerals.

FIG. 1 is a schematic diagram of a signal transmitter device 100 according to some embodiments of the present disclosure. The signal transmitter device 100 includes transmitters 120 and 130 and is thus applicable to related applications for multiple channel data transmission. For ease of illustration, FIG. 1 shows only two sets of transmitters, but is not limited thereto. In other embodiments, the number of transmitters of the signal transmitter device 100 can be greater than two.

The transmitter 120 includes signal processing circuitry 122 and oscillator circuitry 124. The oscillator circuitry 124 generates an oscillating signal SVCO1 with a frequency fVCO1 to the signal processing circuitry 122. The signal processing circuitry 122 processes the baseband signal SDBB according to the oscillating signal SVCO1 and transmits the output signal SVO1. The transmitter 130 includes signal processing circuitry 132 and oscillator circuitry 134. The oscillator circuitry 134 generates an oscillating signal SVCO2 with a frequency fVCO2 to the signal processing circuitry 132. The signal processing circuitry 132 processes the baseband signal SDBB according to the oscillating signal SVCO2 and transmits the output signal SVO2.

Depending on various applications, the fundamental frequency signals SDBB processed by the transmitters 120 and 130 may be the same or different, and the frequency fVCO1 and the frequency fVCO2 may be the same or different. In some embodiments, the oscillating signal SVCO2 can be transmitted to the signal processing circuitry 122 without the signal processing circuitry 132. In this example, the signal processing circuitry 122 can transmit the output signal SVO1 selectively according to the oscillating signal SVCO1 or the oscillating signal SVCO2. As such, when the frequency fVCO1 is different from the frequency fVCO2, the transmitter 120 can be adapted for dual mode applications.

In some embodiments, the transmitter 120 and the transmitter 130 are disposed adjacent to each other. For example, the transmitter 120 is integrated with the transmitter 130 (and/or the oscillator circuitry 134) in a single die. Alternatively, the transmitter 120 and the transmitter 130 (and/or the oscillator circuitry 134) are respectively disposed in the first die and the second die, but the first die and the second die are all packaged in a single package (i.e., the signal transmitter device 100 can be implemented from a plurality of dies and packaged as a single chip or an integrated circuit). In practical applications, the transmitter 120 and the transmitter 130 may interfere with each other, and thus the output signal SVO1 and/or the output signal SVO2 may be in error. For example, the output signal SVO1 is coupled to the oscillator circuitry 124 (i.e., the pulling effect occurs inside the transmitter 120) and the oscillating signal SVCO2 and/or the output signal SVCO1 is coupled to the oscillator circuitry 124 (i.e., the transmitter 130 pulls the transmitter 120), and thus generates an error in the output signal SVO1 of the transmitter 120. In some embodiments, as will be described later, the transmitter 120 (and/or the transmitter 130) is further configured with a calibration circuitry 320 to improve the impacts of multiple sources due to the pulling effect.

Figure 2A:
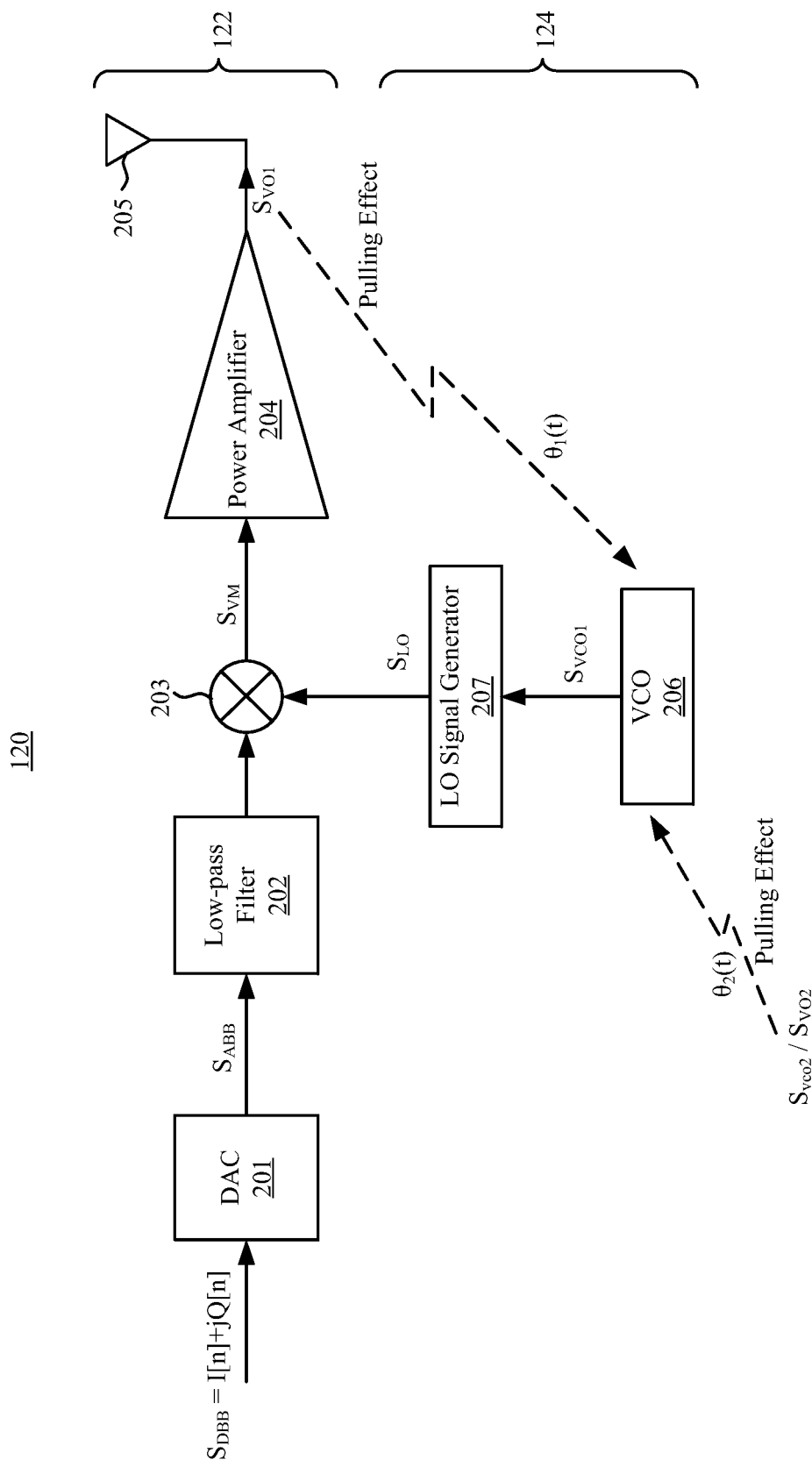
FIG. 2A is a schematic diagram illustrating the emitter of FIG. 1 according to some embodiments of the present disclosure.

FIG. 2A is a schematic diagram illustrating the emitter 120 of FIG. 1 according to some embodiments of the present disclosure. The signal processing circuitry 122 includes a digital-analog converter (DAC) 201, a low-pass filter 202, a mixer 203, a power amplifier 204, and an antenna 205. The oscillator circuitry 124 includes a voltage-controlled oscillator (VCO) 206 and a local oscillating signal generator (LO signal generator) 207.

The digital-analog converter 201 generates an analog signal SABB based on the fundamental frequency signal SDBB. The low-pass filter 202 removes the mirror noise on the analog signal SABB. The voltage-controlled oscillator 206 generates an oscillating signal SVCO1 having a frequency fVCO1. The oscillating signal generator 207 can perform frequency division on the oscillating signal SVCO1 to generate a local oscillating signal SLO having a local frequency fLO. The mixer 203 can up-convert the filtered analog signal SABB according to the oscillating signal SLO1 to output the modulated signal SVM. The power amplifier 204 amplifies the power of the modulated signal SVM to produce an output signal SVO1. The antenna 205 transmits an output signal SVO1. The output signal SVO1 can be expressed as the following Equation (1) in the time domain:

$$S_{VO1}=GA_{BB}(t)\cos(\omega_{LO}t+\theta_{BB}(t)+\sigma) \quad (1)$$

In Equation (1), G is the overall gain of the transmitter 120, SABB(t) is the amplitude of the analog signal SABB, ωLO is the angular frequency corresponding to the local frequency fLO, θBB(t) is the phase of the analog signal SABB, and σ is the additional phase introduced by the baseband signal SDBB as it passes through the transmitter 120.

When the pulling effect illustrated in FIG. 1 occurs, the output signal SVO1 can be adjusted to the following Equation (2):

$$S_{VO1} = GA_{BB}(t)\cos(\omega_{LO}t + \theta_{BB}(t) + \sigma + \theta_1(t) + \theta_2(t)) \quad (2)$$

$$= GA_{BB}(t)\cos(\omega_{LO}t + \theta_{BB}(t) + \sigma + \theta(t))$$

where $\theta_1(t)$ is the phase error introduced by the pulling effect generated by the output signal $S_{VO1}$, and $\theta_2(t)$ is the phase error introduced by another transmitter 130 (for example, the coupling from the oscillating signal $S_{VCO2}$ and/or the output signal $S_{VO2}$) and/or the phase error introduced by the pulling effect, so that the total phase error θ(t) is the sum of $\theta_1(t)$ and $\theta_2(t)$. If the additional phase σ in Equation (2) is 0, and the gain of the transmitter 120 is G=1, the output signal $S_{VO1}$ can be further simplified to the following Equation (3):

$$S_{VO1}=A_{BB}(t)\cos(\omega_{LO}t+\theta_{BB}(t)+\theta(t)) \quad (3)$$

Expanding Equation (3) yields the following Equation (4):

$$S_{VO1} = [A_{BB}(t)\cos(\theta_{BB}(t))\cos(\theta(t))\cos(\omega_{LO}t)] + \quad (4)$$
$$[A_{BB}(t)\sin(\theta_{BB}(t))\cos(\theta(t))(-\sin(\omega_{LO}t))] +$$
$$[A_{BB}(t)\cos(\theta_{BB}(t))\sin(\theta(t))(-\sin(\omega_{LO}t))] -$$
$$[A_{BB}(t)\sin(\theta_{BB}(t))\sin(\theta(t))(\cos(\omega_{LO}t))]$$
$$= [I(t)\cos(\theta(t))\cos(\omega_{LO}t) + Q(t)\cos(\theta(t))(-\sin(\omega_{LO}t))] +$$
$$[I(t)\sin(\theta(t))(-\sin(\omega_{LO}t)) - Q(t)\sin(\theta(t))(\cos(\omega_{LO}t))]$$

where $I(t)=S_{ABB}(t)\cos(\theta_{BB}(t))$, and $I(t)$ is an in-phase data signal corresponding to the fundamental frequency signal $S_{DBB}$. $Q(t)=S_{ABB}(t)\sin(\theta_{BB}(t))$, and $Q(t)$ is a quadrature data signal corresponding to the fundamental frequency signal $S_{DBB}$.

Figure 2B:
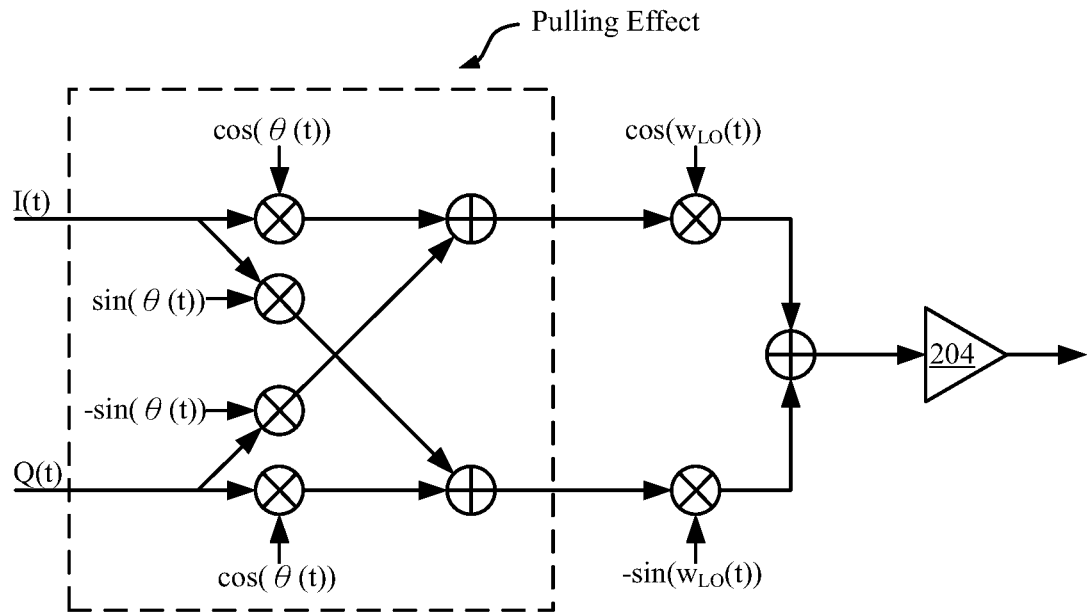
FIG. 2B is a schematic diagram of a mathematical equivalent model in the time when the emitter has a pulling effect.
Figure 2C:
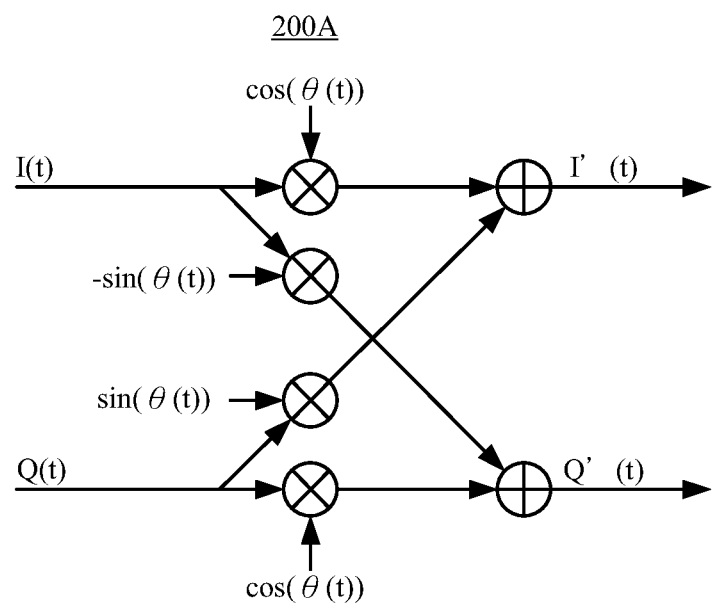
FIG. 2C is a schematic diagram of a mathematical equivalent model of a calibration matrix for suppressing the pulling effect according to some embodiments of the present disclosure.

FIG. 2B is a schematic diagram of a mathematical equivalent model in the time domain when the emitter 120 has a pulling effect. FIG. 2C is a schematic diagram of a mathematical equivalent model of a calibration matrix for suppressing the pulling effect according to some embodiments of the present disclosure.

In some embodiments, before mixing the analog signal SABB, the analog signal SABB may be calibrated by the calibration matrix 200A of FIG. 2C to eliminate the total phase error $\theta(t)$. According to FIG. 2B and FIG. 2C, the in-phase data signal $I(t)$ and the quadrature data signal $Q(t)$ meets Equation (5):

$$\begin{bmatrix} I(t) \\ Q(t) \end{bmatrix} = \begin{bmatrix} \cos(\theta(t)) & -\sin(\theta(t)) \\ \sin(\theta(t)) & \cos(\theta(t)) \end{bmatrix} \begin{bmatrix} \cos(\theta(t)) & \sin(\theta(t)) \\ -\sin(\theta(t)) & \cos(\theta(t)) \end{bmatrix} \begin{bmatrix} I(t) \\ Q(t) \end{bmatrix} \quad (5)$$

The total phase error $\theta(t)$ can be eliminated by pre-calculating the analog signal SABB through the calibration matrix 200A according to Equation (5).

Equation (5) is rewritten as a complex variable function as the following Equation (6):

$$I'(t)+jQ'(t)=[I(t)+Q(t)]e^{[-j\theta(t)]}=[I(t)+Q(t)][\alpha(t)+j\beta(t)] \quad (6)$$

where $I'(t)+jQ'(t)$ is the calibration signal after calculating by the calibration matrix 200A, the phase calibration signal $\alpha(t)$ is $\cos(\theta(t))$, and the phase calibration signal $\beta(t)$ is $-\sin(\theta(t))$. Equivalently, the pre-phase calibration signal $\varphi(t)$ may be generated by the calibration matrix 200A pre-calculating the analog signal $S_{ABB}$, and $\varphi(t)=-\theta(t)$. Thus, when the calibration signal $I'(t)+jQ'(t)$ is mixed by the mixer 203, the pre-phase calibration signal $\varphi(t)$ may cancel out the phase error $\theta(t)$.

Figure 3:
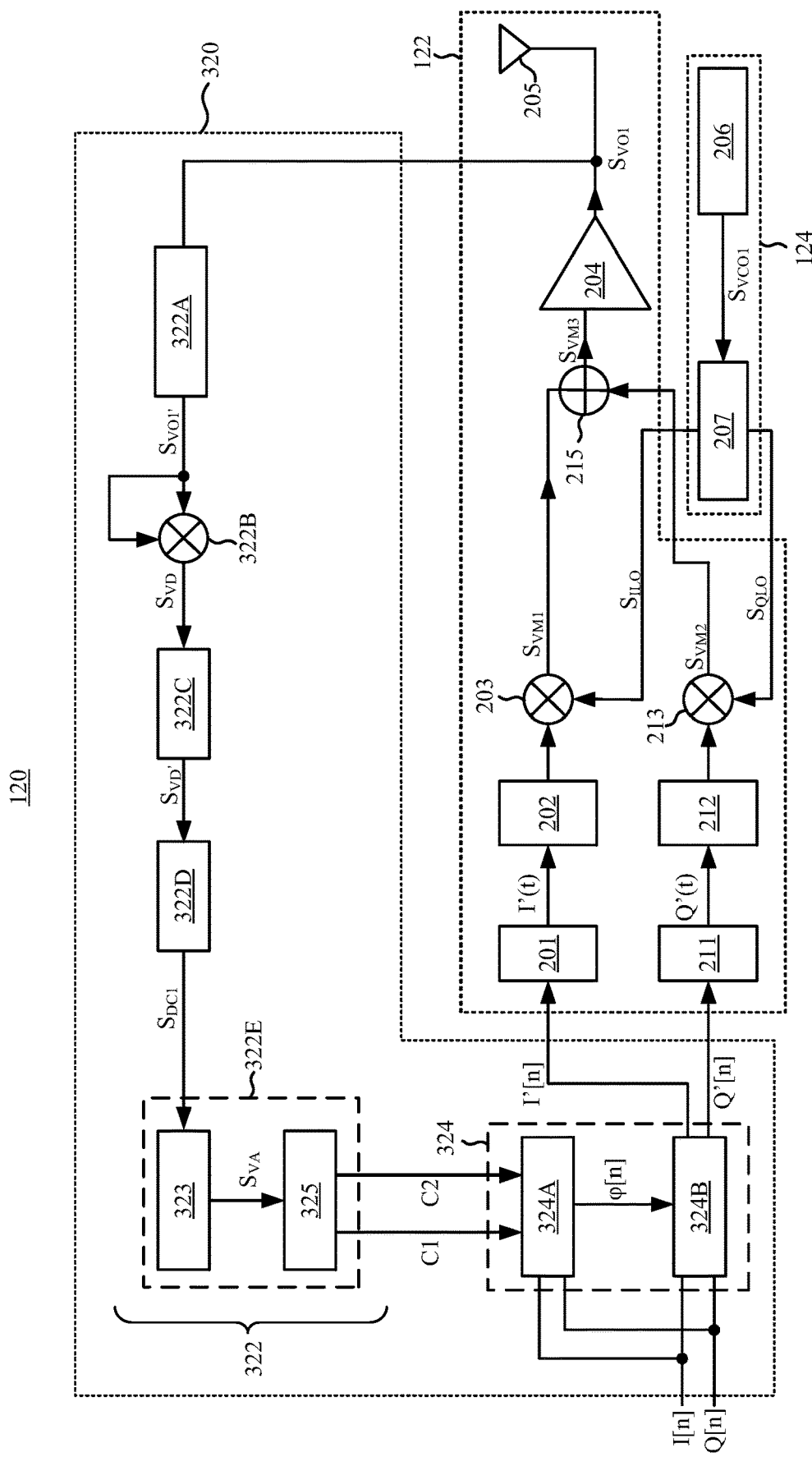
FIG. 3 is a schematic diagram of the transmitter in FIG. 1 according to some embodiments of the present disclosure.

Refer to the contents of the reference document ("Pulling Mitigation in Wireless Transmitter," IEEE JSSC vol. 49, NO. 9, September 2014.) and FIG. 3, the phase error $\theta(t)$ is related to the fundamental frequency signal $S_{DBB}$, wherein the analog signal $S_{ABB}$ corresponding to the fundamental frequency signal $S_{DBB}$ can be formed by superimposing the in-phase data signal $I(t)$ and the quadrature data signal $Q(t)$, that is, $S_{ABB}=I(t)+jQ(t)$. According to FIG. 3 and Equation (6) of the above document, the pre-phase calibration signal $\varphi(t)$ can be expressed as the following Equation (7) after coordinate conversion:

$$\varphi[n]=C1(I^2[N]-Q^2[N])+C2(2I[n]Q[n]) \quad (7)$$

Therefore, the coefficients C1 and C2 in the above Equation (7) can be configured to generate the pre-phase calibration signal $\varphi[n]$. Since $\varphi(t)=-\theta(t)$, after the pre-phase calibration signal $\varphi[n]$ is generated, the calibration matrix 200A may generate the calibration signal $I'(t)+jQ'(t)$ to the transmitter 120 to eliminate the impact of the pulling effect.

The following embodiments will be presented in terms of time or frequency domain concepts. FIG. 3 is a schematic diagram of the transmitter 120 in FIG. 1 according to some embodiments of the present disclosure.

The transmitter 120 includes calibration circuitry 320, and the signal processing circuitry 122 further includes a low-pass filter 212, a mixer 213, an adder 215, a power amplifier 204, and an antenna 205.

The digital-analog converter 201 generates a calibration signal $I'(t)$ based on the calibration signal $I'[n]$. The low-pass filter 202 removes the mirroring caused by the digital-analog conversion on the calibration signal $I'(t)$. The mixer 203 up-converts the filtered calibration signal $I(t)$ according to the local oscillating signal $S_{ILO}$ to output the modulation signal $S_{VM1}$.

The digital-analog converter 211 generates a calibration signal $Q'(t)$ based on the calibration signal $Q'[n]$. The low-pass filter 212 removes the mirroring on the calibration signal $Q'(t)$. The mixer 213 up-converts the filtered calibration signal $Q'(t)$ according to the local oscillating signal $S_{ILO}$ to output the modulation signal $S_{VM1}$. The adder 215 adds the modulation signal $S_{VM1}$ and the modulation signal $S_{VM2}$ to generate the modulation signal $S_{VM3}$. The power amplifier 204 amplifies the modulation signal $S_{VM3}$ to generate an output signal $S_{VO1}$, and transmits the output signal $S_{VO1}$ via the antenna 205.

In some embodiments, the calibration circuitry 320 includes feedback control circuitry 322 and computation circuit 324. The feedback control circuit 322 analyzes the output signal $S_{VO1}$ to generate the digital code $S_{DC1}$, and generates coefficients C1-C2 based on the digital code $S_{DC1}$. The computation circuit 324 generates the calibration signal $I'[n]$ and the calibration signal $Q'[n]$ to the signal processing circuitry 122 according to the coefficients C1-C2, the in-phase data signal $I[n]$ and the quadrature data signal $Q[n]$.

The feedback control circuit 322 includes an attenuator 322A, a self-mixer 322B, an amplifier 322C, an analog-to-digital converter 322D, and a calibration circuit 322E.

The attenuator 322A reduces the power of the output signal $S_{VO1}$ to produce an output signal $S_{VO1'}$ to the self-mixer 322B. In some embodiments, the attenuator 322A can be implemented by at least one coupling capacitor. The self-mixer 322B modulates the output signal $S_{VO1}$ according to the output signal $S_{VO1'}$ to generate the detection signal $S_{VD}$. In some embodiments, the self-mixer 322B can be implemented by a cross-coupled transistor pair.

In some embodiments, if the gain of the power amplifier 204 is relatively low, the output signal $S_{VO1}$ can be directly input to the self-mixer 322B. In this example, the self-mixer 322B self-mixes the output signal $S_{VO1}$ (e.g., performs a square operation on the output signal $S_{VO1}$) to generate the detection signal $S_{VD}$.

The amplifier 322C amplifies the detection signal $S_{VD}$ to generate the detection signal $S_{VD'}$. The amplifier 322C can be an amplifier circuit with a fixed gain or an adjustable gain. The analog-digital converter 322D generates the digital code $S_{DC1}$ based on the detection signal $S_{VD'}$. The calibration circuit 322E generates coefficients C1-C2 based on the digital code $S_{DC1}$.

With reference to FIG. 2A and FIG. 8 of the aforementioned related document and the discussions thereof, the frequency of the output signal $S_{VO1}$ of the transmitter 120 is $f_{LO}+f_M$, where $f_M$ is the frequency of the analog signal $S_{ABB}$ (for example, the frequency of the quadrature data signal Q(t) or the in-phase data signal I(t)). When affected by the pulling effect, two main noises appear at the output of the transmitter 120 at frequencies $f_{LO}+3f_M$ and $f_{LO}-f_M$, respectively. In other words, the output signal $S_{VO1}$ mainly contains a plurality of signals having frequencies $f_{LO}+f_M$, $f_{LO}+3f_M$, and $f_{LO}-f_M$. After mixing (corresponding to the square operation), the detection signal $S_{VD}$ at least includes a plurality of signal components having frequencies of $2f_M$ and $4f_M$. The frequency of the signal component in the detection signal $S_{VD}$ is about two or four times the frequency of the quadrature data signal Q(t) or the in-phase data signal I(t). Accordingly, the digital code $S_{DC1}$ at least includes a plurality of signal components having frequencies of $2f_M$ and $4f_M$. Therefore, multiple signal components having frequencies of $2f_M$ and $4f_M$ can reflect the impact of the pulling effect.

In some embodiments, the calibration circuit 322E includes a signal power detector 323 and an adjustment circuit 325. The signal power detector 323 detects the power of the signal component having the frequency $2f_M$ or $4f_M$ in the digital code $S_{DC1}$ to generate the adjustment signal $S_{VA}$. The adjustment circuit 325 adjusts the coefficients C1-C2 according to the adjustment signal $S_{VA}$. In other embodiments, compared with the signal component having a frequency of $2f_M$, the signal component having a frequency of $4f_M$ has a higher frequency and is more susceptible to attenuation when transmitted. Therefore, the signal power detector 323 can detect only the power of the signal component having the frequency $2f_M$ in the digital code $S_{DC1}$ to generate the adjustment signal $S_{VA}$.

With the above feedback control manner, the coefficients C1-C2 can be adjusted to reduce the power of the plurality of noise signal components having the frequency $f_{LO}+3f_M$ or $f_{LO}-f_M$ in the output signal $S_{VO1}$. As such, the transmitter 120 will be less impacted by the pulling effect.

The following embodiment illustrates detecting the power of a signal component having a frequency of $2f_M$, but the present disclosure is not limited thereto. In other embodiments, the related circuit arranging manner can be reduced by analogy, modified, or replaced according to the arranging manner of each embodiment to detect the power of the signal component having the frequency $4f_M$.

Figure 4:
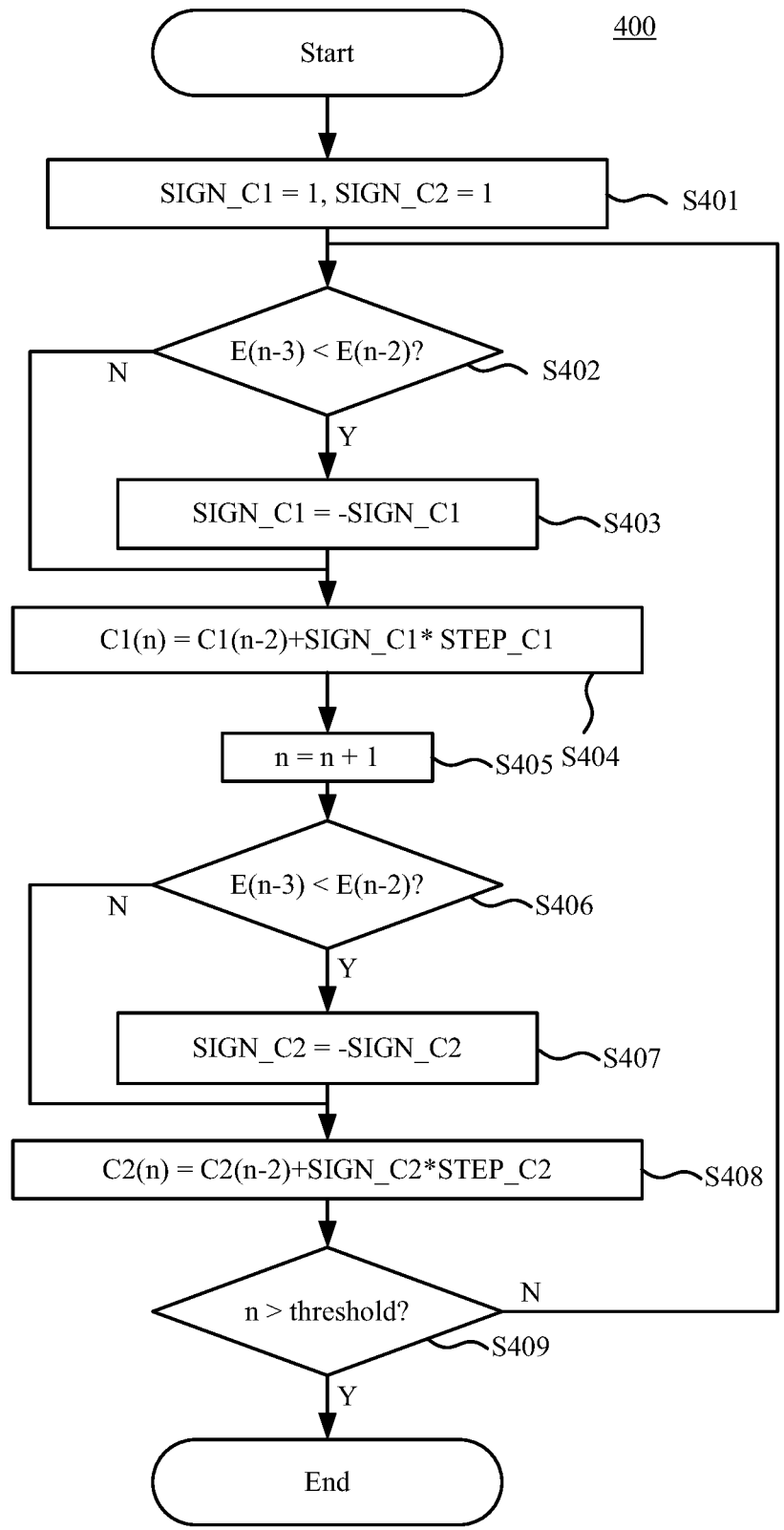
FIG. 4 is a flow chart of a method for adjusting the coefficients according to some embodiments of the present disclosure.

FIG. 4 is a flow chart of a method 400 for adjusting coefficients C1-C2 according to some embodiments of the present disclosure. In some embodiments, the adjustment circuit 325 can be implemented by a digital signal processing circuit to perform the method 400 of FIG. 4 to generate coefficients C1-C2. The digital signal processing circuit can obtain the power of the signal component having the frequency $2f_M$ or $4f_M$ from the adjustment signal $S_{VA}$.

In some embodiments, the coefficients C1-C2 may be adjusted in turn by comparing the power of the signal component having the frequency $2f_M$ or $4f_M$ detected twice consecutively. In FIG. 4, E(n) is the power of a signal component having a frequency of $2f_M$ or $4f_M$, and n is the number of adjustments. In operation S401, the adjustment directions of the coefficients C1-C2 are all increased; alternatively stated, SIGN_C1 and SIGN_C2 are set to 1, where SIGN_C1 and SIGN_C2 respectively indicate the adjustment directions of the coefficients C1 and C2. In operation S402, whether the power of the signal component having the frequency of $2f_M$ or $4f_M$ measured in the previous three times (i.e., E(n-3)) is lower than the power of the signal component having the frequency of $2f_M$ or $4f_M$ measured by the previous two times (i.e., E(n-2)) is confirmed. If yes, operation S403 is performed. Otherwise, operation S404 is performed.

In operation S403, the adjustment direction of the coefficient C1 is set to decrease; alternatively stated, SIGN_C1 is set to −SIGN_C1. As described above, the coefficients C1-C2 are adjusted to reduce the power of the plurality of signal components having the frequency $f_{LO}+3f_M$ or $f_{LO}-f_M$ in the output signal $S_{VO1}$. When the power E(n-3) is lower than the power E(n-2), it is indicated that an error has occurred in the adjustment direction. Under this condition, one of the coefficients C1-C2 may be adjusted first to calibrate the adjustment direction of the coefficients C1-C2. Alternatively, when the power E(n-3) is higher than the power E(n-2), it indicates that the adjustment direction is correct.

In operation S404, a coefficient C1(n) is generated, where C1(n)=C1(n-2)+SIGN_C1*STEP_C1. In the above equation, C1(n-2) is the value of the coefficient C1 at the first two times, and STEP_C1 is a predetermined adjustment value of the coefficient C1. For example, when an error occurs in the adjustment direction of the coefficients C1-C2, the coefficient C1 can be changed to decrease the predetermined adjustment value STEP_C1 to generate anew coefficient C1. Alternatively, when the adjustment directions of the coefficients C1-C2 are correct, the coefficient C1 can be continuously increased by the predetermined adjustment value STEP_C1 to generate a new coefficient C1.

In operation S405, a new coefficient C1(n) is outputted and the coefficient C2 is maintained, and the number of adjustments n is increased, that is, n=n+1.

In operation S406, whether the power of the signal component having the frequency of $2f_M$ or $4f_M$ measured in the previous three times (i.e., E(n-3)) is lower than the power of the signal component having the frequency of 2f or $4f_M$ measured by the previous two times (i.e., E(n-2)) is confirmed. If yes, operation S407 is performed. Otherwise, operation S408 is performed.

In operation S407, the adjustment direction of the coefficient C2 is set to decrease; alternatively stated, SIGN_C2 is set to −SIGN_C2.

In operation S408, a coefficient C2(n) is generated, where C2(n)=C2(n-2)+SIGN_C2*STEP_C2. C2(n-2) is the value of the coefficient C2 at the first two times, and STEP_C2 is a predetermined adjustment value of the coefficient C2.

After the coefficient C1(n) is adjusted, whether or not an error occurs in the adjustment direction of the coefficient C2 can be confirmed by the same manner, and output the coefficient C2(n) after confirming the adjustment direction of the coefficient C2. Operations S406 to S408 are similar to operations S402 to S404, and thus are not repetitively described herein.

In operation S409, whether the number of adjustments n exceeds a threshold value is confirmed. If so, the adjustment is ended and the coefficients C1-C2 are outputted. If not, operation S402 is repeatedly performed to further adjust the coefficients C1-C2 to better values. By setting operation S409, the operational efficiency of the transmitter 120 can be maintained.

The above adjustment manner of the coefficients C1-C2 is merely given for illustration. Various configurations of adjustable coefficients C1-C2 are within the contemplated scope of the present disclosure.

Continuing with reference to FIG. 3, the computation circuit 324 includes a phase calibration circuit 324A and a calibration signal generation circuit 324B. The phase calibration circuit 324A generates the pre-phase calibration signal φ[n] based on the coefficients C1-C2, the in-phase data signal I[n], and the quadrature data signal Q[n]. The calibration signal generating circuit 324B generates the calibration signals I'[n] and Q'[n] to the digital-analog converter 201 and 112 based on the pre-phase calibration signal ([n], the in-phase data signal I[n], and the quadrature data signal Q[n]. In some embodiments, the calibration signal generation circuit 324B is implemented using a digital circuit that can perform the calibration matrix 200A shown in FIG. 2C. The calibration signal generating circuit 324B can generate the phase error θ(t) according to the pre-phase calibration signal q[n], and perform the operation of Equation (5) to generate the calibration signals I'(t) and Q'(t).

Figure 5:
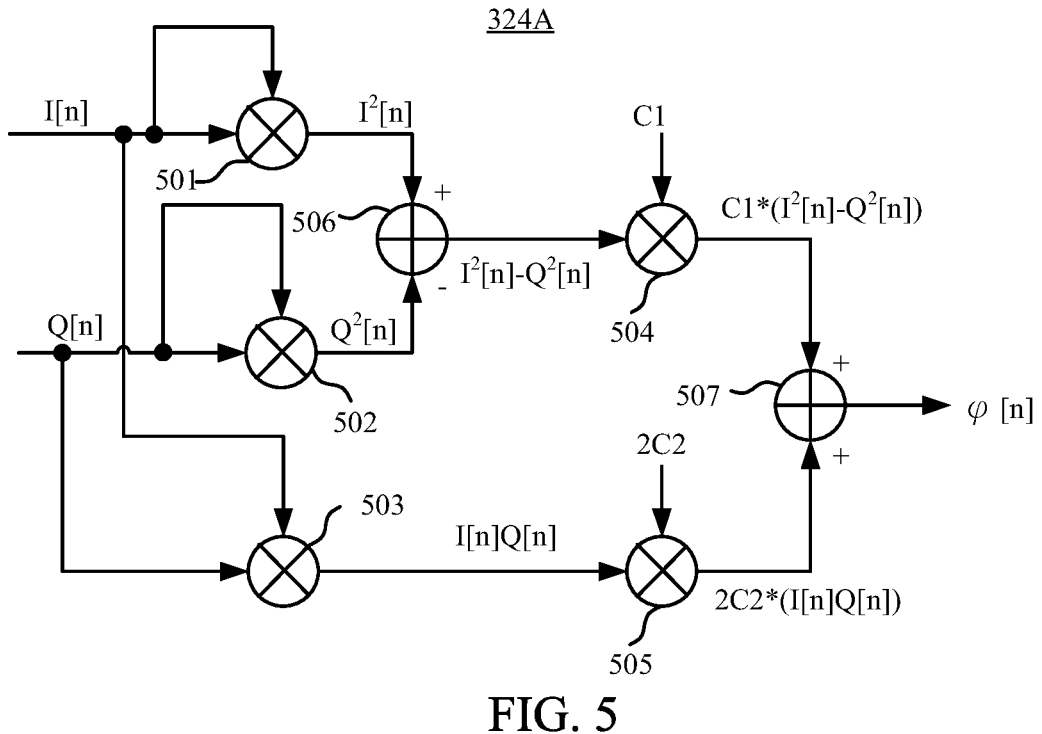
FIG. 5 is a schematic diagram illustrating the phase calibration circuit of FIG. 3 according to some embodiments of the present disclosure.

FIG. 5 is a schematic diagram illustrating the phase calibration circuit 324A of FIG. 3 according to some embodiments of the present disclosure. In this example, the phase calibration circuit 324A includes multipliers 501-505, a subtractor 506, and an adder 507. The phase calibration circuit 324A in this example is applicable to narrowband applications.

The multiplier 501 squares the in-phase data signal I[n] to generate an operation value $I^2[n]$. The multiplier 502 squares the quadrature data signal Q[n] to generate an operational value $Q^2[n]$. The multiplier 503 multiplies the in-phase data signal I[n] and the quadrature data signal Q[n] to generate an operation value I[n]Q[n]. The subtracter 506 subtracts the operation value $Q^2[n]$ from the operation value $I^2[n]$ to generate the operation value $I^2[n]-Q^2[n]$. The multiplier 504 multiplies the coefficient C1 by the operation value $I^2[n]-Q^2[n]$ to generate the operation value $C1*(I^2[n]-Q^2[n])$.

The multiplier 505 multiplies twice the coefficient C2 and the operation value I[n]Q[n] to generate an operation value $2C2*(I[n]Q[n])$. The adder 507 adds the operation value $C1*(I^2[n]-Q^2[n])$ and the operation value $2C2*(I[n]Q[n])$ to generate the pre-phase calibration signal φ[n]. According to Equation (7), the phase calibration circuit 500 can generate the pre-phase calibration signal φ[n] to eliminate the influence of the pulling effect.

Figure 6:
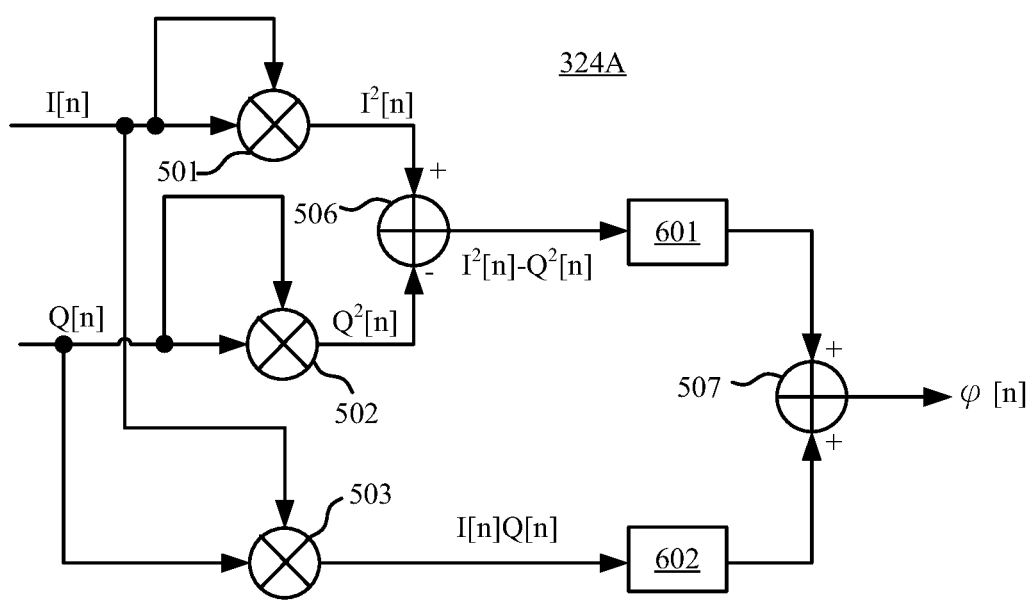
FIG. 6 is a schematic diagram illustrating the phase calibration circuit of FIG. 3 according to some embodiments of the present disclosure.

FIG. 6 is a schematic diagram illustrating the phase calibration circuit 324A of FIG. 3 according to some embodiments of the present disclosure. The phase calibration circuit 324A in this example is applicable to broadband applications.

Compared to FIG. 5, the phase calibration circuit 324A further includes finite impulse filters 601-602, which replace the mixer 504 and the mixer 505, respectively.

In some embodiments, the finite impulse filters 601-602 can generate the desired operational values by designing the coefficients of each order (TAP). For example, in the bandwidth to be calibrated by the transmitter 120, N test signals of frequency $f_i$ can be sequentially input to the transmitter 120, where i is 1, 2, ..., N, N is a positive integer. The signal power detector 323 can detect the power of the signal component having the frequency $2f_i$ or $4f_i$. At the same time, the coefficients C1-C2 are adjusted via the method 400 to reduce the power of the signal component having the frequency $2f_i$ or $4f_i$. When the power of the signal component having the frequency $2f_i$ or $4f_i$ is minimized, the current coefficients C1-C2 are stored as the filter coefficients C1,i and C2,i. After obtaining N sets of the coefficients C1,i and C2,i, inverse Fourier transform can be performed on C1,i-C1,N and their respective conjugate numbers. In this way, the respective coefficients of the $N^{th}$ order of the finite impulse filter 601 can be obtained from the real part of the calculated result. Similarly, inverse Fourier transform can be performed on 2C2,i-2C2,N and their respective conjugate numbers. In this way, each coefficient of the $N^{th}$ order of the finite impulse filter 602 can be obtained from the real part of the result of the calculation. Accordingly, when the operation value $I^2[n]-Q^2[n]$ and the operation value I[n]Q[n] pass through the finite impulse filters 601-602, the finite impulse filters 601-602 can output corresponding operation values to the adder 507 to generate a pre-phase calibration signal φ[n].

In summary, the signal transmitter device and the calibration method provided by the embodiments of the present disclosure can generate a plurality of calibration signals, to simultaneously eliminate errors caused by the pulling effect of the transmitter itself and external circuits adjacent to the transmitter. As a result, the performance of multiple transmitters in a signal transmitter device for multiple channel transmission applications can be improved.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims.

What is claimed is:

1. A signal transmitter device, comprising:
 a first transmitter, comprising:
  a first oscillator circuitry configured to output a first oscillating signal;
  a signal processing circuitry configured to mix a plurality of calibration signals according to the first oscillating signal to transmit a first output signal; and
  a calibration circuitry configured to detect a power of the first output signal to generate a plurality of coefficients, and configured to generate the plurality of calibration signals according to the plurality of coefficients, an in-phase data signal and an quadrature data signal; and
 a second oscillator circuitry disposed adjacent to the first transmitter and configured to output a second oscillating signal,
 wherein the plurality of calibration signals are configured to reduce a sum of a first phase error introduced by a pulling generated by the first output signal to the first oscillator circuitry and a second phase error introduced by a pulling generated by the second oscillating signal to the first oscillator circuitry;
 wherein the plurality of coefficients are calculated according to the sum of the first phase error and the second phase error.

2. The signal transmitter device of claim 1, wherein the second oscillator circuitry is configured to output the second oscillating signal to a second transmitter to transmit a second output signal, and the plurality of calibration signals are configured to reduce the pulling generated by all of the first output signal, the second oscillating signal, and the second output signal to the first oscillator circuitry.

3. The signal transmitter device of claim 1, wherein the first transmitter and the second oscillator circuitry are disposed in a single die, or are respectively disposed in a first die and a second die which are packaged in a single package.

4. The signal transmitter device of claim 1, wherein the frequency of the first oscillating signal is the same as the frequency of the second oscillating signal.

5. The signal transmitter device of claim 1, wherein the frequency of the first oscillating signal is different from the frequency of the second oscillating signal.

6. The signal transmitter device of claim 1, wherein the calibration circuitry comprises a feedback control circuit, and the feedback control circuit comprises:
a self-mixer configured to modulate the first output signal according to the first output signal to generate a detecting signal;
an amplifier configured to amplify the detecting signal;
an analog-to-digital converter configured to generate a digital code according to the amplified detection signal; and
a calibration circuit configured to generate the plurality of coefficients based on the digital code.

7. The signal transmitter device of claim 6, wherein the feedback control circuit further comprises:
an attenuator configured to reduce the power of the first output signal to generate a second output signal to the self-mixer,
wherein the self-mixer is configured to generate the detection signal according to the second output signal.

8. The signal transmitter device of claim 6, wherein the calibration circuit comprises:
a signal power detector configured to detect a power of a signal component according to the digital code to generate an adjustment signal, wherein the frequency of the signal component is twice or four times the frequency of the in-phase data signal or the quadrature data signal; and
an adjustment circuit configured to adjust the plurality of coefficients according to the adjustment signal to reduce the power of the signal component.

9. The signal transmitter device of claim 8, wherein the adjustment circuit is configured to obtain the power of the signal component according to the adjustment signal, and is configured to sequentially adjust a first coefficient and a second coefficient of the plurality of coefficients.

10. The signal transmitter device of claim 9, wherein the adjustment circuit is configured to adjust the first coefficient and the second coefficient in turn according to the power of the signal component detected twice consecutively.

11. The signal transmitter device of claim 9, wherein when the number of the adjustment of the first coefficient and the second coefficient by the adjustment circuit exceeds a threshold value, the adjustment circuit is configured to end adjusting the first coefficient and the second coefficient.

12. The signal transmitter device of claim 1, wherein the calibration circuitry further comprising a computation circuit, and the computation circuit comprises:
a phase calibration circuit configured to generate a pre-phase calibration signal according to the plurality of coefficients, the in-phase data signal, and the quadrature data signal; and
a calibration signal generation circuit configured to generate the plurality of calibration signals according to the pre-phase calibration signal, the in-phase data signal, and the quadrature data signal.

13. The signal transmitter device of claim 12, wherein the phase calibration circuit comprises:
a first multiplier configured to square the in-phase data signal to generate a first operation value;
a second multiplier configured to square the quadrature data signal to generate a second operation value;
a third multiplier configured to multiply the in-phase data signal and the quadrature data signal to generate a third operation value;
a subtracter configured to subtract the second operation value from the first operation value to generate a fourth operation value;
a fourth multiplier configured to multiply a first coefficient of the plurality of coefficients and the fourth operation value to generate a fifth operation value;
a fifth multiplier configured to multiply twice a second coefficient of the plurality of coefficients and the third operation value to generate a sixth operation value; and
an adder configured to add the fifth operation value and the sixth operation value to generate the pre-phase calibration signal.

14. The signal transmitter device of claim 12, wherein the phase calibration circuit comprises:
a first multiplier configured to square the in-phase data signal to generate a first operation value;
a second multiplier configured to square the quadrature data signal to generate a second operation value;
a third multiplier configured to multiply the in-phase data signal and the quadrature data signal to generate a third operation value;
a subtracter configured to subtract the second operation value from the first operation value to generate a fourth operation value;
a first finite impulse filter configured to receive the fourth operation value and output a fifth operation value;
a second finite impulse filter configured to receive the third operation value and output a sixth operation value; and
an adder configured to add the fifth operation value and the sixth operation value to generate the pre-phase calibration signal.

15. A calibration method, comprising:
mixing, by a first transmitter, a plurality of calibration signals according to a first oscillating signal to transmit a first output signal, wherein the first oscillating signal is provided by a first oscillator circuitry of the first transmitter;
detecting a power of the first output signal to generate a plurality of coefficients; and
generating the plurality of calibration signals according to the plurality of coefficients, an in-phase data signal and a quadrature data signal,
wherein the plurality of calibration signals are configured to reduce a sum of a first phase error introduced by a pulling generated by the first output signal to the first oscillator circuitry and a second phase error introduced by a pulling generated by a second oscillating signal to the first oscillator circuitry, and the second oscillating signal is provided by second oscillator circuitry disposed adjacent to the first transmitter;
wherein the plurality of coefficients are calculated according to the sum of the first phase error and the second phase error.

16. The calibration method of claim 15, wherein the first transmitter and the second oscillator circuitry are disposed in a single die, or are respectively disposed in a first die and a second die which are packaged in a single package.

17. The calibration method of claim 15, wherein the second oscillating signal is provided to a second transmitter to transmit a second output signal, and the plurality of calibration signals are configured to reduce the pulling generated by all of the first output signal, the second oscillating signal, and the second output signal to the first oscillator circuitry.

18. The calibration method of claim 15, wherein the frequency of the first oscillating signal is the same as the frequency of the second oscillating signal.

19. The calibration method of claim 15, wherein the frequency of the first oscillating signal is different from the frequency of the second oscillating signal.

\* \* \* \* \*